US012760474B2

(12) United States Patent
Hofstaetter

(10) Patent No.: US 12,760,474 B2
(45) Date of Patent: Oct. 13, 2026

(54) MACHINE AND METHOD FOR STABILIZING A TRACK

(71) Applicant: Plasser & Theurer Export von Bahnbaumaschinen Gesellschaft m.b.H., Vienna (AT)

(72) Inventor: Josef Hofstaetter, Puchenau (AT)

(73) Assignee: Plaser & Theurer Export von Bahnbaumaschinen Gesellschaft m.b.H., Vienna (AT)

(*) Notice: Subject to any disclaimer, the term of this patent is extended or adjusted under 35 U.S.C. 154(b) by 1139 days.

(21) Appl. No.: 17/637,770

(22) PCT Filed: Aug. 12, 2020

(86) PCT No.: PCT/EP2020/072626

§ 371 (c)(1),
(2) Date: Feb. 23, 2022

(87) PCT Pub. No.: WO2021/052684

PCT Pub. Date: Mar. 25, 2021

(65) Prior Publication Data

US 2022/0316145 A1 Oct. 6, 2022

(30) Foreign Application Priority Data

Sep. 18, 2019 (AT) .................................. A 297/2019

(51) Int. Cl.

*E01B 27/20* (2006.01)
*B06B 1/16* (2006.01)
*B06B 1/18* (2006.01)

(52) U.S. Cl.

CPC .............. *E01B 27/20* (2013.01); *B06B 1/164* (2013.01); *B06B 1/186* (2013.01); *E01B 2203/127* (2013.01)

(58) Field of Classification Search

CPC ... E01B 27/20; E01B 2203/127; B06B 1/164; B06B 1/186

See application file for complete search history.

(56) References Cited

U.S. PATENT DOCUMENTS

| | | | | |
|---|---|---|---|---|
| 5,010,778 A | | 4/1991 | Riedl | |
| 5,617,794 A | * | 4/1997 | Theurer | E01B 27/20 104/7.2 |

(Continued)

FOREIGN PATENT DOCUMENTS

| | | |
|---|---|---|
| CN | 1678410 A | 10/2005 |
| DE | 34 10 449 A1 | 9/1985 |

(Continued)

OTHER PUBLICATIONS

International Search Report in PCT/EP2020/072626 mailed Sep. 18, 2020.

(Continued)

*Primary Examiner* — Gary S Hartmann
(74) *Attorney, Agent, or Firm* — Collard & Roe, P.C.

(57) ABSTRACT

A track-stabilizing machine has a frame with rail-mounted running gears and at least one height-adjustable stabilizing unit that runs on the rails via work-unit rollers. It includes a vibration exciter with rotating unbalanced masses to generate an impact force that acts dynamically in a plane normal to the track's longitudinal direction, and a linear drive to apply a load to the track. A main and a secondary unbalanced mass generate different centrifugal forces at the same rotational speed, depending on the direction of rotation. These masses have a first phase shift relative to each other; when rotated in the opposite direction, they have a second, different phase shift. This change in phase shift alters both the direction and the magnitude of the impact force.

13 Claims, 4 Drawing Sheets

(56) References Cited

U.S. PATENT DOCUMENTS

| | | | | |
|---|---|---|---|---|
| 7,117,758 | B2 | 10/2006 | Riedl | |
| 8,505,459 | B2 * | 8/2013 | Miller | E01B 27/12 104/7.2 |
| 9,441,330 | B2 * | 9/2016 | Alford | F16H 25/08 |
| 11,891,761 | B2 * | 2/2024 | Wollanek | E01B 27/20 |
| 12,157,978 | B2 * | 12/2024 | Bernhard | G01M 7/025 |
| 2006/0067796 | A1 | 3/2006 | Riedl | |
| 2008/0298893 | A1 | 12/2008 | Stenzel et al. | |
| 2021/0071369 | A1 | 3/2021 | Wollanek et al. | |

FOREIGN PATENT DOCUMENTS

| | | | | |
|---|---|---|---|---|
| EP | 0 092 014 | A1 | 10/1983 | |
| JP | 2023505854 | A * | 2/2023 | E01B 27/20 |
| RU | 2376093 | C2 | 12/2009 | |
| WO | 03/028905 | A1 | 4/2003 | |
| WO | 2004/022250 | A1 | 3/2004 | |
| WO | 2007/065604 | A1 | 6/2007 | |
| WO | 2008/009314 | A1 | 1/2008 | |
| WO | 2019/158288 | A1 | 8/2019 | |

OTHER PUBLICATIONS

Chinese Search Report in Chinese Application No. 202080060024X dated Jan. 6, 2024.

Russian Search Report in Russian Application No. 2020103459 dated Dec. 6, 2022.

* cited by examiner

MACHINE AND METHOD FOR STABILIZING A TRACK

CROSS REFERENCE TO RELATED APPLICATIONS

This application is the National Stage of PCT/EP2020/072626 filed on Aug. 12, 2020, which claims priority under 35 U.S.C. § 119 of Austrian Application No. A 297/2019, filed on Sep. 18, 2019, the disclosure of which is incorporated by reference. The international application under PCT article 21(2) was not published in English.

FIELD OF TECHNOLOGY

The invention relates to a machine for stabilising a track, having a machine frame supported on rail-based running gears and a height-adjustable stabilising unit which can be rolled on rails of the track by means of work unit rollers, comprising a vibration exciter with rotating unbalanced masses for generating an impact force acting dynamically in a track plane normal to a longitudinal direction of the track and a linear drive for generating a load acting on the track. The invention additionally relates to a method for operating such a machine.

PRIOR ART

One of today's recognised maintenance measures in the superstructure is the compaction of the ballast bed by means of dynamic track stabilisers after tamping work has been performed. This method not only increases the lateral track resistance of the track panel, but also achieves a high track quality over a longer period of time.

The compaction effect is influenced by several parameters, including compaction frequency, vibration amplitude, vertical load, and dynamic impact force. Due to the material behaviour of the ballast, the frequency is limited to the range of approx. 32-38 Hz. The ballast bed shows optimal behaviour in this range.

Machines for stabilising a track are already known from prior art. In a so-called dynamic track stabiliser, stabilising units located between two rail-based running gears are lowered onto a track to be stabilised using a height adjustment, and a vertical load is applied to them. A transverse vibration of the stabilising units is transmitted to the track through work unit rollers and clamp rollers in contact with the outer sides of the rail heads during continuous forward travel.

Such a machine is known, for example, from WO 2008/009314 A1. Therein, the stabilising unit comprises adjustable unbalanced masses in order to quickly reduce the impact force to a reduced value or to zero as required (e.g. in the case of fixed structures, such as bridges or tunnels) and to raise it to the original value immediately after reaching a track section to be stabilised.

As the frequency can only be varied within a limited range, one has started to vary the impact force by adjusting the position of the eccentric masses. Here, one disadvantage is the constructive set-up of the moving parts, which is very time-consuming and complex to implement. This also results in corresponding costs for servicing and maintenance.

SUMMARY OF THE INVENTION

The object of the invention is to provide a stabilising unit that is robust and as simple as possible for a machine of the kind mentioned above in order to significantly improve the cost efficiency of its operation in terms of maintenance costs compared to prior art. In addition, a method of compacting the ballast bed of the superstructure carried out by means of the machine is to be indicated.

According to the invention, these objects are achieved by way of a machine according to claim 1 and a method according to claim 11. Dependent claims indicate advantageous embodiments of the invention.

The invention provides that a main unbalanced mass and a secondary unbalanced mass produce different centrifugal forces at the same rotational speed depending on the direction of rotation, the two unbalanced masses being coupled in such a way that, when rotating in one direction of rotation, the unbalanced masses have a first phase shift in relation to one another and that, when rotating in the opposite direction of rotation, the unbalanced masses have a second phase shift in relation to one another which differs from the first phase shift. Depending on the arrangement of the unbalanced masses, a changed phase shift changes both the direction and the strength of the impact force.

At least one main unbalanced mass and at least one secondary unbalanced mass are assigned to a rotation shaft, the main unbalanced mass being firmly connected to the shaft. This shaft-hub connection is designed as a positive or frictional engagement, or as a substance-to-substance bond.

The secondary unbalanced mass is arranged in such a way that it can be freely rotated within a defined angular range. This defined angular range is specified depending on the drive's direction of rotation and thus results in two possible phase shifts of different magnitudes between the main unbalanced mass and the assigned secondary unbalanced mass, wherein end stops in the respective direction of rotation determine the position of the main unbalanced mass in relation to the secondary unbalanced mass. For the further embodiments, one main unbalanced mass and one assigned secondary unbalanced mass on the same axis of rotation will be referred to as a pair of unbalanced masses.

The main components of the stabilising unit are, in its simplest possible constructive set-up, a rotation shaft and a pair of unbalanced masses consisting of a main unbalanced mass and a secondary unbalanced mass.

It is advantageous if the catching of the secondary unbalanced masses by the main unbalanced masses occurs positively, i.e. purely passively, by means of so-called catches. From a construction perspective, it is possible to design these catches as independent components, but it is also possible to integrate the catching function into one single component by shaping the main unbalanced masses accordingly. This special shape or geometric arrangement of the catches results in a predefined angular range in which a free rotary movement of the secondary unbalanced masses between the end stops is possible.

In a particularly advantageous further development, the stabilising unit comprises two counter-rotating rotation shafts that are coupled via gearwheels and the pairs of unbalanced masses associated with each shaft. Here, depending on the alignment and phase position of the pairs of unbalanced masses to each other and thus the individual centrifugal forces and their different effective directions, there is an addition or subtraction of the force vectors in the machine housing. It is usually provided that all centrifugal force components in the vertical direction subtract, thus cancel each other out, while the centrifugal force components in the horizontal direction add up, thus achieving the resulting maximum possible total impact force in the horizontal effective direction. This results in at least two impact forces of different magnitudes in order to be able to change the impact force acting on the track in a targeted manner.

Additionally, it is favourable if the respective unbalanced mass is arranged on the stabilising unit with an axis of rotation aligned in the longitudinal direction of the track. This alignment is particularly suitable for use in a stabilising unit, as the resulting impact force acts normal to the longitudinal direction of the track to be stabilised. In this way, an optimal energy input into the track is provided.

It can also be advantageous that at least two pairs of unbalanced masses are assigned to a rotation shaft, wherein the pairs of unbalanced masses each comprise a main unbalanced mass and a secondary unbalanced mass on the same axis of rotation. Depending on the requirement for the total impact force, or its magnitude, several pairs of unbalanced masses can be arranged in series on a rotation shaft.

When operating two stabilising units on one machine, it is possible to either couple them by means of a shared drive, or to operate them independently of each other by means of independent drives for each stabilising unit.

If, in an advantageous further development, two independently driven stabilising units are used on one machine, up to eight impact forces with different magnitudes can be actuated; this results mathematically from $3^2-1=8$.

In one embodiment of the invention, it is provided that in the case of independently driven stabilising units, the respective drives are actuated by means of a shared control device.

Thus, the individual drives can be optimally adjusted to each other and precisely actuated. Equal-vibration or counter-vibration operation can be ensured through phase synchronisation of the non-coupled stabilising units. This is particularly advantageous for actuating the 8 different impact forces mentioned above.

In a simple embodiment, at least two stabilising units are coupled for operation on one machine, for example, via a cardan shaft. Here, a shared drive enables a very compact set-up of the overall arrangement.

For the drive of the rotation shaft, it is provided that the drives are designed as hydraulic actuators. Thus, the drives can be integrated into an already existing hydraulic system of the machine.

In another embodiment of the invention, it may be advantageous if the respective drives are designed as electric actuators. Especially with new machine concepts that provide a modern and more efficient overall operation with power supply via accumulators or overhead lines, a useful integration is possible.

The method for operating a machine according to the invention provides that at least one stabilising unit is set down on the track via a linear drive and a load is applied to it, and that at least one pair of unbalanced masses is driven via a rotation shaft with the direction of rotation being reversible. This ensures track stabilisation that can be adapted to local conditions with a variable impact force.

In a favourable further development of the method, an increase in the driving power of a drive of the stabilising unit is controlled by a so-called soft start. Therein, a predefined, increasing ramp is stored in a higher-level control system, which enables a targeted increase within a defined period of time in order to avoid shocks in the end stops of the unbalanced masses.

A further realisation of the method enables a variable adjustment of the impact force in the range between selectable impact force levels by changing the engine speed of the respective, associated drive. This provides the operator with great flexibility and precision in track stabilisation.

BRIEF DESCRIPTION OF THE DRAWINGS

In the following, the invention is explained by way of example with reference to the accompanying figures. The following figures show in schematic illustrations.

DESCRIPTION OF THE EMBODIMENTS

Figure 1:
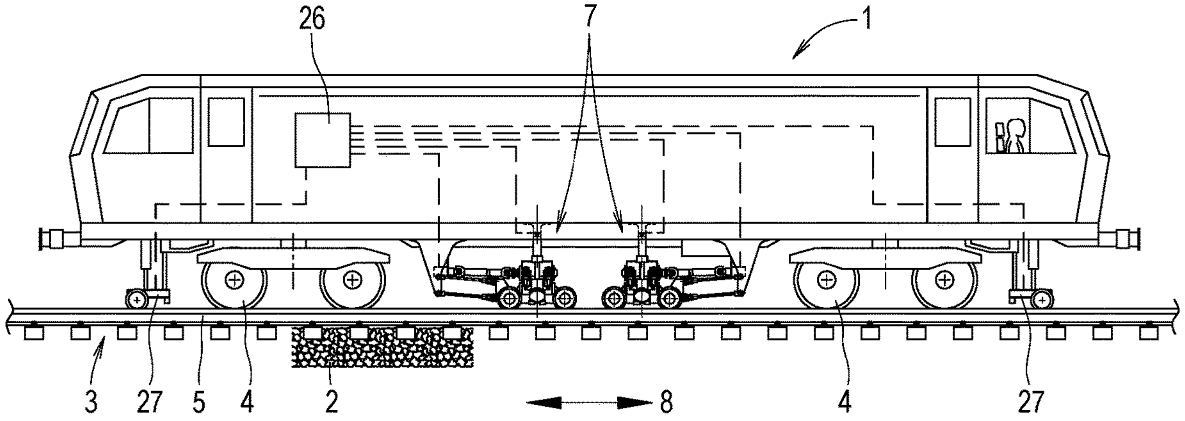
FIG. 1 Side view of a machine for stabilising a track

FIG. 1 shows a simplified machine 1 for stabilising a track 3 resting on ballast 2, comprising a machine frame 6 supported on rails 5 by rail-based running gears 4. Two stabilising units 7 are arranged behind one another in the longitudinal direction of the track 8 between the two rail-based running gears 4 positioned at the ends. They are each connected to the machine frame 6 in a vertically adjustable manner by linear drives 9.

A measuring system 27 for recording the rail geometry is arranged on the machine frame 6. A control device 26 is set up for processing the data received from the measuring system 27 as well as for determining the adjustment parameters for operating and actuating the stabilising units 7, the linear drives 9, and the drives 13.

The embodiment shown in FIG. 1 shows independent, non-coupled stabilising units 7 with separate drives 13. The following figures (FIG. 2 and FIG. 3) show possible embodiments with coupled as well as non-coupled stabilising units 7.

Figure 2:
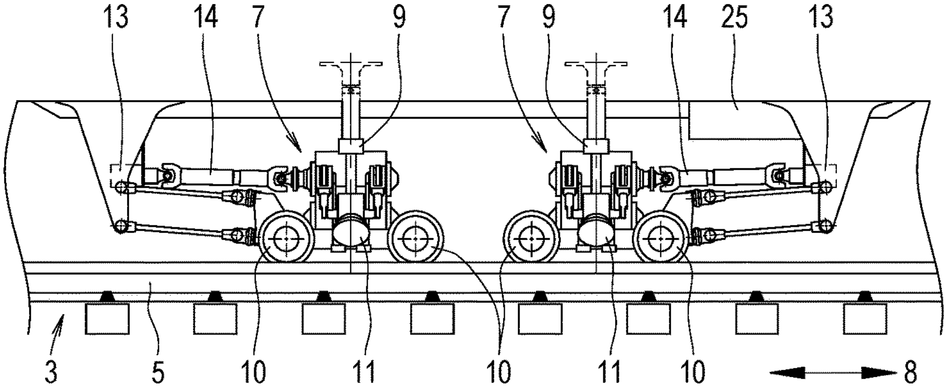
FIG. 2 Stabilising units, independent, with separate drives

FIG. 2 shows independent stabilising units with separate drives. By means of work unit rollers 10 that can roll on the rails 5, each stabilising unit 7 can be brought into positive engagement with the track 3 in order to cause it to vibrate at a desired vibration frequency. The work unit rollers 10 comprise, for each rail 5, two wheel flange rollers which roll on the inside of the rail 5 and a clamp roller. In operation, the clamp roller is pressed against the rail 5 from the outside by means of a clamp mechanism 11. A vertical static load is applied to the track 3 by the linear drives 9.

The drives 13 of the stabilising unit 7 are connected to a shared supply device 25. For electric drives 13, for example, this is a motor-generator unit supplied from an electrical storage unit. An overhead line can also be used to supply electric drives 13 if the machine 1 has pantographs and corresponding converters. If hydraulic drives 13 are used, it is useful if the supply device 25 is integrated into a hydraulic system of the machine 1.

Figure 3:
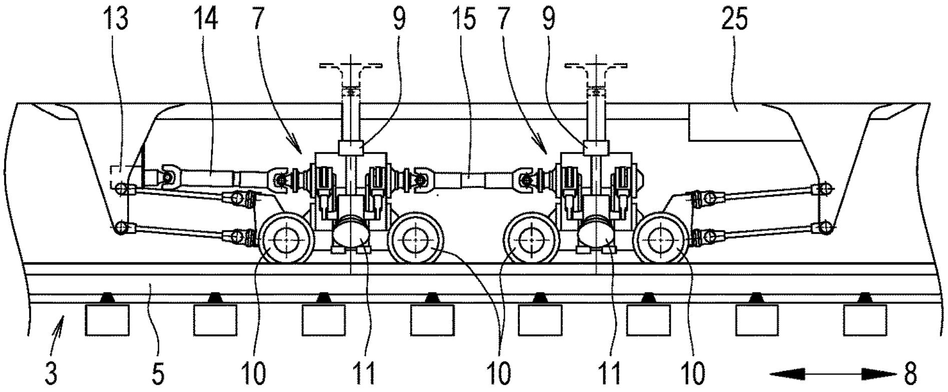
FIG. 3 Stabilising units, coupled, with shared drive

FIG. 3 shows an alternative with coupled stabilising units and a shared drive. The basic set-up of the stabilising units 7 is identical to the embodiment shown in FIG. 2. The difference lies in the coupling of the arrangement in the longitudinal direction of the track 8 and the design of the drives 13. The stabilising units 7 are in drive connection via a connecting shaft 15. The drive 13 and the connecting shaft 14 are only singly realised.

Figure 4:
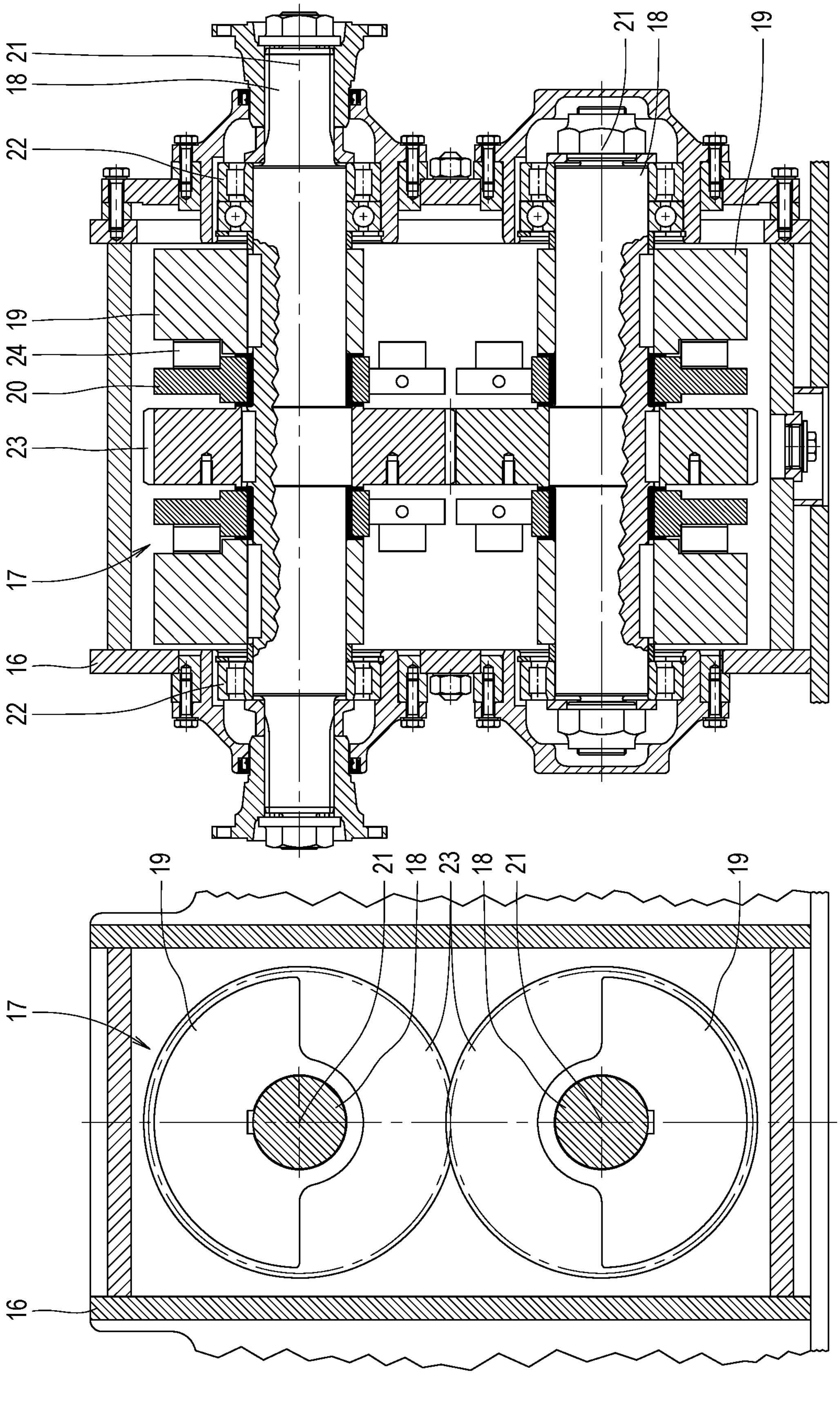
FIG. 4 Detailed views of a stabilising unit/sectional views

In FIG. 4, one of the stabilising units 7 is shown in detail in sectional views. A vibration exciter 17 is arranged in a housing 16 and has two axes of rotation 21, each with one rotation shaft 18 with unbalanced masses arranged thereon. A main unbalanced mass 19 and a secondary unbalanced mass 20 form a pair of unbalanced masses. Each rotation shaft 18 is rotatably mounted on both sides in the housing 16 via roller bearings 22.

The unbalanced masses 19, 20 are coupled via so-called catches 24, herein designed as independent elements. They are congruently attached directly to the main unbalanced mass 19 as well as to the secondary unbalanced mass 20.

The counter-rotating rotation shafts 18 are mechanically coupled via gearwheels 23, wherein the power transmission to the rotation shaft 18 takes place positively via a feather key connection.

The secondary unbalanced masses 20 are freely rotatably mounted on the rotation shaft 18 via plain bearings, while the main unbalanced masses 19 are firmly connected to the rotation shaft 18 via a feather key connection.

The construction shown in FIG. 4 herein shows two pairs of unbalanced masses arranged axially on each of the rotation shafts 18, i.e. two main unbalanced masses 19 with two secondary unbalanced masses 20 each. The simplest possible technical solution is a set-up with only one rotation shaft 18 and only one pair of unbalanced masses arranged thereon.

Figure 5:
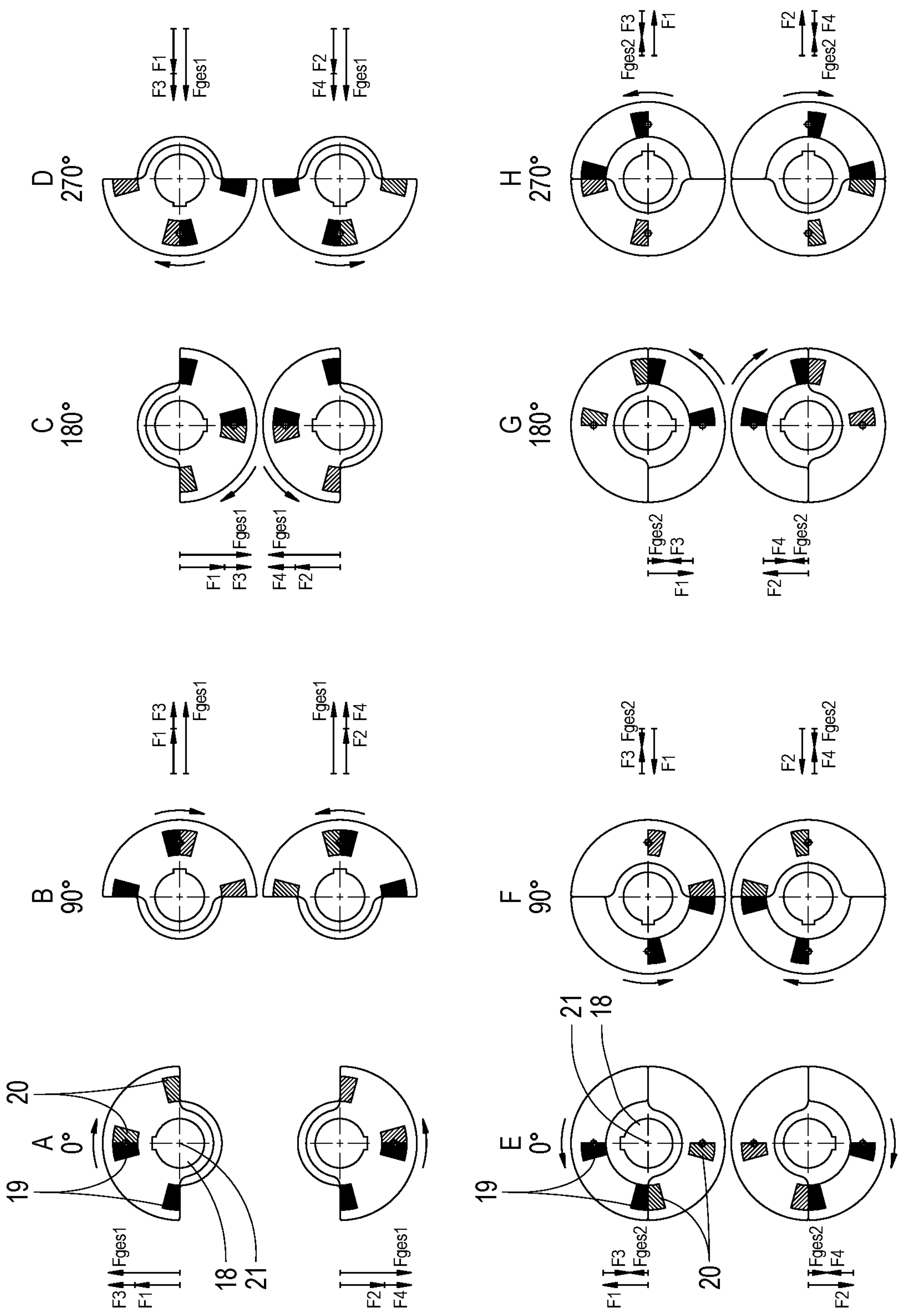
FIG. 5 Unbalance adjustment depending on the direction of rotation via catches FIG. 6 Unbalance adjustment via engine speed control in the intermediate range

FIG. 5 is a schematic illustration of the unbalance adjustment via catches 24, which depends on the direction of rotation. Illustrations A, B, C, D, E, F, G, H show the angular positions 0°, 90°, 180°, and 270° for both directions of rotation, wherein each illustration consists of an upper and a lower rotation shaft 18. The indicated direction of rotation always refers to the upper rotation shaft 18; the lower rotation shaft 18 rotates in the opposite direction of rotation due to mechanical coupling.

Illustrations A to D show clockwise operation (clockwise direction of rotation); illustrations E to H show anticlockwise operation (anticlockwise direction of rotation).

The set-up in illustration A (angular position 0°) comprises the upper, clockwise rotation shaft 18 with a pair of unbalanced masses arranged thereon. The main unbalanced mass 19 with associated catches 24 (finely hatched) produces a centrifugal force F1 from the pivot in the vertical direction. The secondary unbalanced mass 20 with associated catches 24 (roughly hatched) also produces a centrifugal force F3 from the pivot in the vertical direction. The sum of the two centrifugal forces F1 and F3 results in the total centrifugal force Fges1. At the lower rotation shaft 18 (anticlockwise), the total centrifugal force Fges1 acts as the sum of F2 and F4 with the same magnitude in the opposite direction. The forces thus cancel each other out, and, when reduced, act on the entire stabilising unit 7. No force acts in the vertical direction.

In illustration B (angular position 90°), the total centrifugal force Fges1 acts from the pivot in the horizontal direction. The force situation is the same at the lower rotation shaft 18 (anticlockwise). Here, the total centrifugal force Fges1 acts as the sum of F2 and F4 with the same magnitude in the same direction. The forces add up and with 2*Fges1 result in the maximum possible impact force in the horizontal direction on the track 3.

The resulting forces in illustrations C (angular position 180°) and D (angular position 270°) behave analogously to illustrations A and B; here, the total centrifugal forces Fges1 are also cancelled out (C) and doubled (D).

The set-up in illustration E (angular position 0°) now shows an anticlockwise rotation shaft 18 with a pair of unbalanced masses arranged thereon. The changed direction of rotation results in a different angular position of the two unbalanced masses 19, 20 in relation to each other. The main unbalanced mass 19 with associated catches 24 (finely hatched) produces a centrifugal force F1 from the pivot upwards in the vertical direction. The secondary unbalanced mass 20 with associated catches 24 (roughly hatched) produces a centrifugal force F3 from the pivot downwards in the vertical direction. The sum of the two centrifugal forces F1 and F3 results in the total centrifugal force Fges2. At the lower rotation shaft 18 (anticlockwise), the total centrifugal force Fges2 acts as the sum of F2 and F4 with the same magnitude in the opposite direction. The forces thus cancel each other out, and, when reduced, act on the entire stabilising unit 7. No force acts in the vertical direction.

In illustration F (angular position 90°), the total centrifugal force Fges2 acts from the pivot in the horizontal direction. The force situation is the same at the lower rotation shaft 18 (anticlockwise). Here, the total centrifugal force Fges2 acts as the sum of F2 and F4 with the same magnitude in the same direction. The forces add up and with 2*Fges2 result in the minimum possible impact force in the horizontal direction on the track 3.

The resulting forces in illustrations G (angular position 180°) and H (angular position 270°) behave analogously to illustrations E and F; here, the total centrifugal forces Fges2 are also cancelled out (G) and doubled (H).

Figure 6:
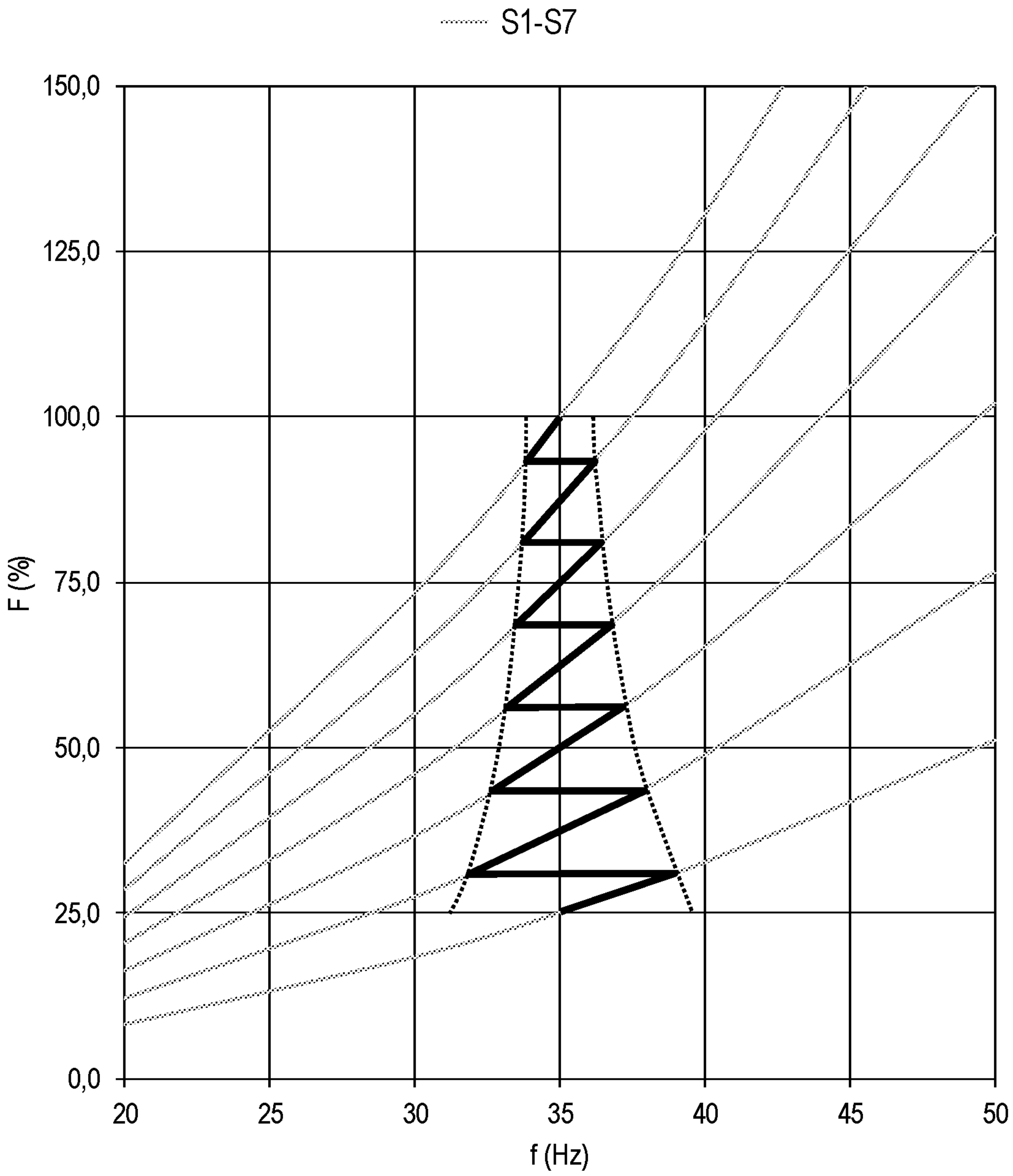

FIG. 6 shows in a diagram how the impact force can be variably adjusted through low engine speed control. If two independently driven stabilising units 7 are used on a machine 1, up to eight impact forces with different magnitudes can be actuated; this results from $3^2-1=8$.

The range between the impact force levels can now be compensated by changing the engine speed of the respective associated drive 13 within a very narrow frequency band. When all intermediate areas of the impact force levels S1-S7 are passed through completely (thick lines), a so-called frequency control funnel is created (dotted lines). The ordinate shows the impact force F in % above the abscissa with the frequency f in Hz.

The invention claimed is:

1. A machine for stabilizing a track, with a machine frame supported on rail-based running gears and at least one height-adjustable stabilizing unit which can be rolled on rails of the track via work unit rollers, comprising:

- a vibration exciter for generating an impact force acting dynamically in a track plane normal to a longitudinal direction of the track, and
- a linear drive for generating a load acting on the track, said linear drive comprising:
  - at least one rotation shaft;
  - a main unbalanced mass coupled to said at least one rotation shaft; and
  - a secondary unbalanced mass rotatably coupled to said at least one rotation shaft and rotatable within a pre-defined angular range and configured to produce different centrifugal forces depending on the direction of rotation, wherein said main unbalanced mass and said secondary unbalanced mass form two unbalanced masses being coupled together wherein, during rotation in one direction of rotation, said main unbalanced mass and said secondary unbalanced mass are positioned on said at least one rotation shaft at a first position to have a first phase shift with respect to one another, and that, when rotating in the opposite direction of rotation, said main unbalanced mass and said secondary unbalanced mass are positioned at a second position on said at least one rotation shaft to have a second phase shift with respect to each other which differs from the first phase shift; and a plurality of constructive elements comprising catches, said plurality of constructive elements coupled to at least one of said main unbalanced mass and said secondary unbalanced mass and configured to limit a rotation of said secondary unbalanced mass relative to said main unbalanced mass on said at least one rotation shaft;

wherein said main unbalanced mass and said secondary unbalanced mass comprise a pair of unbalanced masses and depending on the direction of rotation of each of said main unbalanced mass and said secondary unbalanced mass, one of two predetermined phase shifts results therefrom.

2. The machine according to claim 1, further comprising a plurality of gearwheels and wherein said at least one rotation shaft comprises at least two counter-rotating rotation shafts which are coupled via said plurality of gearwheels.

3. The machine according to claim 1, wherein each of said main unbalanced mass and said secondary unbalanced mass is arranged on the at least one height-adjustable stabilizing unit with an axis of rotation aligned in the longitudinal direction of the track.

4. The machine according to claim 1, wherein said main unbalanced mass and said secondary unbalanced mass form at least one pair of unbalanced masses that are coupled to a rotation shaft, the at least one pair of unbalanced masses each comprising a main unbalanced mass and a secondary unbalanced mass on a same axis of rotation.

5. The machine according to claim 1, further comprising a plurality of drives and further comprising at least one additional height adjustable stabilizing unit, wherein each stabilizing unit is driven by a separate drive of said plurality of drives.

6. The machine according to claim 5, further comprising a shared control device wherein said plurality of drives are actuated via said shared control device.

7. The machine according to claim 1, further comprising at least one additional stabilizing unit, wherein at least one drive of said plurality of drives is coupled to an overall arrangement of at least one height-adjustable stabilizing unit.

8. The machine according to claim 5, wherein at least one drive of said plurality of drives comprises a hydraulic actuator.

9. The machine according to claim 5, wherein at least one drive of said plurality of drives comprises an electric actuator.

10. The machine as in claim 1, wherein said secondary unbalanced mass has a direction of rotation that is dependent on said main unbalanced mass.

11. A method for operating a machine according to claim 2, comprising the steps of:

setting down said at least one height adjustable stabilizing unit on the track via a linear drive, that has a load applied to said linear drive, and driving said at least one rotation shaft of said at least two counter-rotating rotation shafts by an assigned drive of said plurality of drives with a reversible direction of rotation.

12. The method according to claim 11, further comprising the step of:

increasing a driving power of a drive of the at least one height adjustable stabilizing unit that is controlled via a soft start, wherein a predefined, increasing ramp is stored in a higher-level control system, which enables a targeted increase within a defined period of time.

13. The method according to claim 11, further comprising the step of:

changing an engine speed of a drive to enable a variable adjustment of an impact force in a range between predefined impact force levels.

* * * * *